June 18, 1940.    C. C. FARMER    2,204,795
BRAKE CYLINDER DEVICE
Filed July 13, 1938
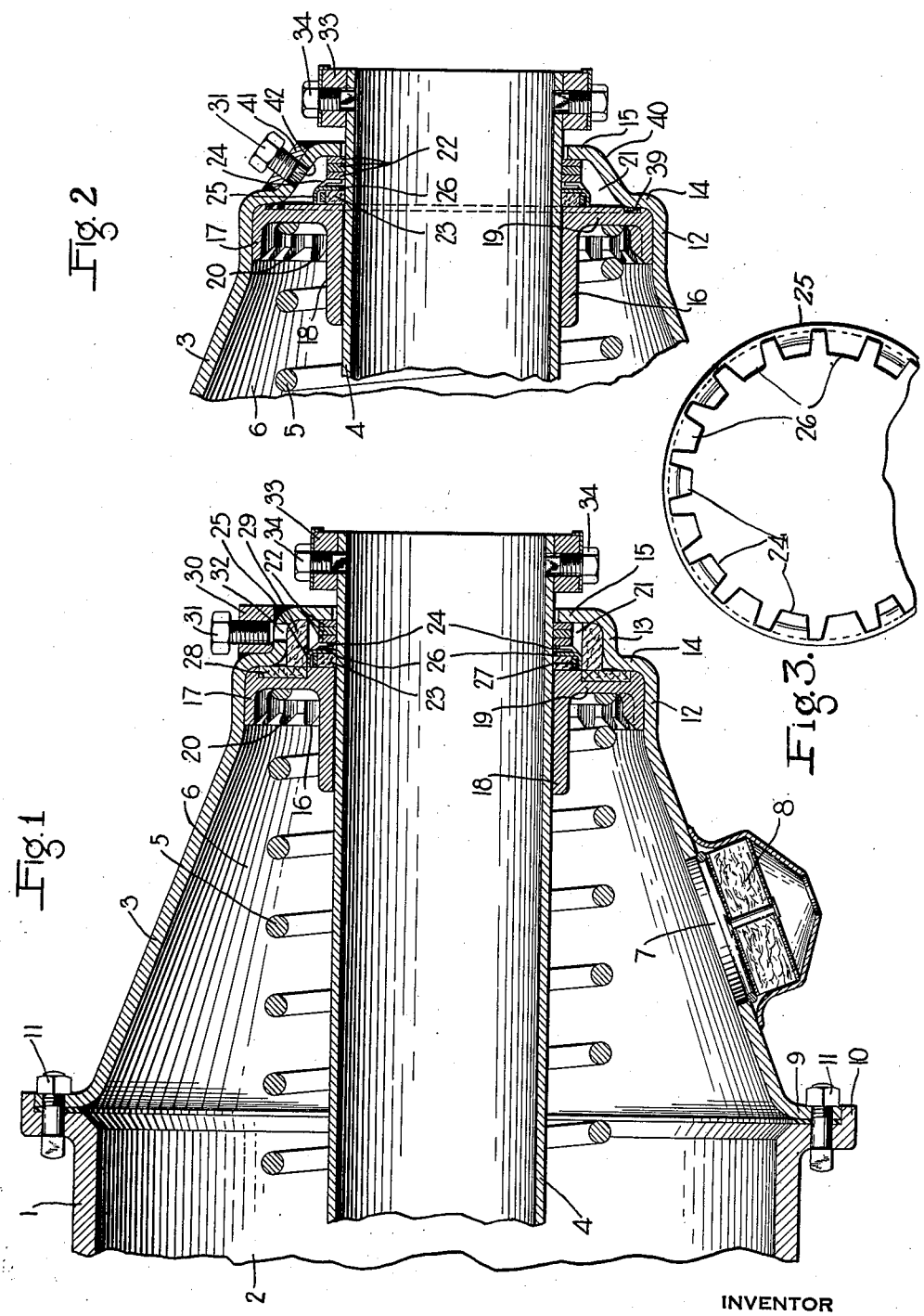
INVENTOR
CLYDE C. FARMER
BY A. M. Miggins
ATTORNEY Patented June 18, 1940

2,204,795

UNITED STATES PATENT OFFICE 2,204,795

BRAKE CYLINDER DEVICE

Clyde C. Farmer, Pittsburgh, Pa., assignor to The Westinghouse Air Brake Company, Wilmerding, Pa., a corporation of Pennsylvania Application July 13, 1938, Serial No. 218,977

8 Claims. (Cl. 308—4)

This invention relates to fluid pressure brakes and more particularly to brake cylinder devices such as employed in connection therewith.

The non-pressure head at present employed on brake cylinder devices is drawn from sheet steel and is provided at its smaller end with an integrally formed inturned axial sleeve-like extension in which the usual brake cylinder piston rod, also made of steel, is adapted to slide. Means are provided to lubricate the bearing surface between the piston rod and non-pressure head and also to prevent the entrance of dirt or other foreign matter along the piston rod into such bearing and to the interior of the brake cylinder.

In spite of adequate lubrication and the exclusion of dirt it has however been found that occasionally in service the piston rod becomes scored. This is very undesirable, since scoring increases the friction between the parts which retards the movement of the piston and is liable, in releasing the brakes, to prevent full release movement of the brake cylinder piston. Scoring of the piston rod also tends to permit leakage of air and dirt from the atmosphere along the piston rod into the brake cylinder which is also very undesirable since it tends to further increase such scoring and in the brake cylinder is liable to damage the cylinder wall and packing cup carried by the brake cylinder piston and engaging said wall.

The principal object of the present invention is to provide an improved non-pressure head which will obviate the above difficulty and which is also simpler in construction and less expensive to manufacture than formerly employed heads.

Other objects and advantages will be apparent from the following more detailed description of the invention.

In the accompanying drawing; Fig. 1 is a sectional, longitudinal view of a portion of a brake cylinder device showing one form of the improved non-pressure head applied thereto; Fig. 2 is a view similar to a portion of Fig. 1 showing a modified form of the invention; and Fig. 3 is a detail view of a part shown in Figs. 1 and 2.

Description of parts

As shown in the drawing, the brake cylinder device comprises a casing 1 having a piston bore 2 closed at one end by a non-pressure head 3 constructed in accordance with the invention, and containing a piston (not shown) which is provided with a piston rod 4 mounted to slide through a suitable opening in said non-pressure head. The piston rod 4 is made of any desired material, but preferably of steel in the form of tubing. A release spring 5 encircling the piston rod 4 is interposed between and bears at one end on the non-pressure head 3 and at the opposite end on the breake cylinder piston (not shown) for moving said piston to its release position in the usual manner.

Within the non-pressure head there is formed the usual non-pressure chamber 6 which is open to the atmosphere through an aperture 7 in the side wall of said head. The aperture 7 is provided to permit air to be discharged from and drawn into the chamber 6 upon reciprocation of the brake cylinder piston (not shown) in the bore 2 in effecting application and release of brakes. An air strainer 8, of any desired structure, is provided over aperture 7 to prevent dirt in the atmosphere entering chamber 6 when air is drawn into said chamber.

Only a portion of the brake cylinder device is shown in the drawing, but in view of the fact that such devices are so well known a further showing is not deemed essential to a clear understanding of the invention to be now described.

The non-pressure head 3 is drawn from sheet metal to the substantially frustro-conical shape shown and is provided at its larger end with an outturned annular flange 9 adapted to fit against the end of the brake cylinder body 1 within the usual annular bead 10 and be secured to said body by bolts 11 in the usual well known manner.

The non-pressure head is provided adjacent its smaller end with two adjacent relatively shallow substantially cylindrical portions 12 and 13. The cylindrical portion 12 is of larger diameter than 13 and is joined thereto by a wall 14 formed substantially at right angles to the axis of the brake cylinder device. The outer end of the cylindrical portion 13 is joined to an inturned annular flange 15 extending substantially at right angles to the axis of the brake cylinder device and encircling an opening in axial alignment with and preferably of somewhat greater diameter than the piston rod 4 which extends through said opening to the outside of the non-pressure head.

A piston rod bearing element 16 is disposed within the non-pressure head 3 for carrying the piston rod 4. The element 16 is made of any suitable bearing material for the steel rod such as cast or malleable iron, and comprises an outer cylindrical portion 17 having a free sliding fit within the cylindrical portion 12 of the non-pressure head, and a smaller concentric cylindrical portion 18 of greater length than the portion 17 and connected to portion 17 by an annular base portion 19. The portion 18 is provided with an axial bore in which the piston rod 4 is supported and mounted to slide. The end of the release spring 5 engages the base portion 19 of the bearing element for urging same into engagement with the wall 14 of the non-pressure head whereby said bearing element is rigidly held by said spring in predetermined relation to said head.

The inside wall of the cylindrical portion 17 of bearing element 16 is provided throughout its circumference with spaced longitudinally extending slots 20 for the purpose of rendering said element as light in weight as possible, and the end of spring 5 has a close fit within the parts of said wall between said slots for holding the spring central with respect to the bearing element.

The base portion 19 of the bearing element 16 cooperates with the end flange 15 of the non-pressure head 3 to form within the cylindrical portion 13 thereof an annular recess 21 around the piston rod 4.

Contained in the recess 21 and encircling and having snug sliding contact with the piston rod 4 are a plurality of metallic protector rings 22 engaging each other, and an oil swab 23 preferably in the form of a felt ring interposed between the rings 22 and the bearing member 16.

The protector rings 22 are held in contact with each other and the flange or end wall 15 of the non-pressure head by spaced projections or fingers 24 extending from a ring 25 which encircles the swab 23 and abuts against the bearing member 16. The ring 25 is also provided with fingers 26 spaced alternately with respect to fingers 24 and bearing against one side of the swab 23 urging the opposite side against the bearing member 16. The ring 25 is more clearly shown in a detail view of it alone in Fig. 3. An outer cylindrical ring 27 is provided within the ring 25 encircling the swab 23 urging it into lubricating contact with the rod 4.

A resilient ring gasket 28 carried in a recess in the bearing element 16 is compressed into said recess between said bearing element and the wall 14 of the non-pressure head by the action of the return spring 5, in order to provide a seal between chamber 21 and the non-pressure chamber 6. An oil absorbing and carrying ring 29 is disposed in chamber 21 substantially filling the space between the swab retaining ring 25 and the cylindrical portion 13 of the non-pressure head and between the inner portion of gasket 28 and the end wall 15 of the non-pressure head.

A boss 30 is secured in any desired manner, as by welding, to the exterior of the cylindrical portion 13 of the non-pressure head. The boss 30 has a screw-threaded bore, normally closed by a removable plug 31, and which registers with a bore 32 through the non-pressure head leading to chamber 21.

A stop ring 33 is secured to the piston rod 4 by set-screws 34 for holding the parts of the non-pressure head assembled against the pressure of spring 5 when said head is removed from the cylinder body 1, in the well known manner.

*Assembling of parts*

The parts of the non-pressure head 3 are assembled with the piston rod 4, which is rigidly connected to the brake cylinder piston (not shown), in the following manner, the stop ring 33 being removed from the rod 4 at this time.

The return spring 5 is first placed over the rod 4 and then by any suitable means (not shown) is compressed against the piston and secured in this compressed condition.

The bearing element 16 in which the gasket 28 is already provided is then slipped onto the rod 4, followed by the swab 23 encircled by the rings 27 and 25, and finally by the protector rings 22 and felt oil ring 29. Next the non-pressure head 3 is slipped over the rod 4 and due to the spring 5 being held in a compressed state, the non-pressure head slides past the end of the rod 4 sufficiently far to permit the stop ring 33 to be secured by screws 34 to the end of the rod.

After the stop ring 33 is secured to the rod 4, the spring 5 is released and expands between the brake cylinder piston (not shown) and the bearing element 16, urging said element and the parts ahead of said element to their working position, as shown in the drawing.

The parts are disassembled in an order just the reverse of that above described and it will be readily apparent that renewal of any of the parts can be readily accomplished.

*Operation*

In operation, the piston rod 4 is adapted to reciprocate through the bearing element 16, swab 23 and protector or scraper rings 22 in effecting application and release of brakes.

Due to the dissimilar character of the metals from which the rod 4 and bearing element 16 are made, i. e., steel and cast or malleable iron, respectively, scoring of these parts is prevented. In fact, movement of the steel piston rod in the cast or malleable iron bearing 16 actually results in a smoothing or polishing of the rod.

The oil swab 23 and ring 29 are preferably oil soaked at the time of application to the non-pressure head and oil from the swab 23, which is resiliently pressed against the rod 4 by the spring ring 27, lubricates the bearing surface of said rod so as to thereby provide and maintain low frictional resistance to movement thereof through the bearing 16.

The oil ring 29 acts as a storage reservoir for oil from which the oil may creep to the swab 23 for maintaining said swab more or less saturated, to provide efficient lubrication of the rod 4 over a relatively long period of time.

When necessary, the oil in the ring 29 and swab can be replenished by removing plug 31 and forcing oil through the opening in boss 30 and the aperture 32 to the ring 29 and into the chamber 21.

When the gasket 28 is made of felt or other oil absorbing material, it will be noted that the portion thereof extending into chamber 21 will also absorb oil supplied to said chamber and thus act in conjunction with the ring 29 as an oil reservoir from which oil will creep to the swab 23 as the oil thereon is used to lubricate the rod 4.

Oil cannot readily be held in a free state in chamber 21 due to leakage, which cannot be totally avoided in devices of this character. Oil will therefore leak past the protector rings 22 and through the bearing between rod 4 and element 16. If the felt ring 29 were not used the length of time over which the piston rod 4 would be efficiently lubricated would be governed substantially by the oil carrying capacity of the felt swab 23. The oil ring 29 overcomes this difficulty however and will act even if there is no free oil in chamber 21 to provide a source of supply for swab 23 whereby said swab is enabled to provide lubricant to rod 4 for a relatively long period of time.

The protector or scraper rings 22 have two functions. One function is to prevent the entrance of dirt or other foreign matter from the atmosphere along the rod 4 to chamber 21 as the rod moves to release position so as to thereby maintain the bearing between the rod 4 and swab 23 and bearing element 16 clean in order to hold wear and resistance to movement of these parts to a minimum. The other and very important function of rings 22 is that they act as scrapers to remove from the rod 4 any foreign matter, such as rust, which may collect thereon while the rod is held in application position exposed to the elements, before the rod moves into the brake cylinder. The scrapers remove this foreign matter to thereby provide a smooth surface for movement through the swab 23 and bearing element 16 so as to prevent the felt or similar material from which the swab is made being torn and rendered useless and to also prevent binding in the bearing element 16. The swab 23 being protected and pressed by the ring 27 against the rod 4 by only a relatively light pressure is thus adapted to function efficiently for an indefinite period of time.

It is desired to amplify further the importance of the scraper rings 22 in protecting the swab 23, for the use of such a swab for the purpose of lubrication or for any other reason is considered impractical without such protection. Brake cylinders such as are employed on railroads at the present time are so air tight, that when for instance a car is set out of a train onto a siding with the air brakes applied, as is customary, the brakes will remain applied for an indefinite period of time unless intentionally released. As a result, the piston rod 4 of brake cylinder devices is often held in application position outside of the brake cylinder and thus exposed to the elements for such periods of time as will produce rusting of the rod and adherance of foreign matter thereto. If this rust or foreign matter is not removed from the rod before the rod is moved into the cylinder through the swab 23 and bearing 16 the swab will be torn to pieces and rendered useless, while the bearing element 16 and rod will also be damaged. The scraper rings 22 obviously avoid such damage.

The provision of a non-pressure head drawn from steel and provided with recesses for the reception of the bearing element 16, swab 23, protector rings 22 and other parts associated therewith is considered a marked forward step in brake cylinder devices, for such a design, as clearly described above, is not only cheaper to manufacture, but it is cheaper to maintain and provides for more efficient operation over a longer period of time than ever before attained in brake cylinder devices.

*Modification shown in Fig. 2*

The modified form of the invention shown in Fig. 2 differs from that shown in Fig. 1 in that no oil ring 29 is provided in chamber 21 and a sealing gasket 39 made of a leak proof material such as cork or rubber is interposed between the bearing element 16 and the wall 14 of the non-pressure head 3. Since no oil ring 29 is provided it will be noted that the non-pressure head is not provided with a cylindrical portion 13 connecting the wall 14 and flange 15, but instead said wall and flange are connected by a frustro-conical shaped wall 40. A boss 41 is secured to the outside of wall 40 by welding and is provided with a screw-threaded lubricant supply passage, normally closed by plug 31 and connected to an aperture 42 through said wall leading to the chamber 21. Through this plug and aperture oil is adapted to be supplied to the chamber 21 for saturating the swab 23.

It will be noted that oil supplied to chamber 21 may gradually leak out along the rod 4 in both directions until the oil level is reduced to slightly below said rod when said leakage ceases. The gasket 39 prevents leakage from chamber 21 past the bearing element 16, so that a pool of oil will be held in chamber 21 below the rod 4 from which oil will creep to the swab 23 for maintaining said swab conditioned to lubricate the rod 4.

It will be noted that gasket 39 is preferably made of cork or the like to hold the oil pool in chamber 21, whereas in the construction shown in Fig. 1, the corresponding gasket 28 need not be made of such material, but instead may be of felt since in this construction the ring 29 acts as the lubricant supply reservoir from which leakage by actual flow will not occur from chamber 21 as in the case of the construction shown in Fig. 2.

While two illustrative embodiments of the invention have been described in detail, it is not the intention to limit its scope to these embodiments or otherwise than by the terms of the appended claims.

Having now described my invention, what I claim as new and desire to secure by Letters Patent is:

1. A non-pressure head having one end for attachment to the body of a brake cylinder device of the type having a movable piston rod and a brake cylinder piston release spring encircling said rod, said non-pressure head having in the opposite end an axial opening through which said rod extends, and comprising a combined bearing and support element for said rod slidably mounted in said head and forced into abutting engagement with said opposite end of said head by said spring, said opposite end of said head being cooperative with said bearing member to rigidly hold said bearing member against radial movement.

2. A non-pressure head for a brake cylinder device of the type having a movable piston rod and a release spring encircling said rod, said head comprising a frustro-conical shaped portion the smaller end of which terminates in a cylindrical recess having a bottom wall provided with an axial opening through which said rod is adapted to operate, an annular element mounted in said recess and having a sliding fit with the side wall of said recess, said element having a central bearing portion in which said rod is slidably mounted and supported, said element supporting the adjacent end of said spring and being forced thereby into abutting engagement with said bottom wall.

3. A non-pressure head for a brake cylinder device of the type having a movable piston rod and a brake cylinder piston release spring encircling said rod, said head comprising a frustro-conical shaped portion the smaller end of which terminates in a cylindrical recess having a bottom wall provided with an axial opening through which said rod is adapted to operate, an annular element disposed in said recess in engagement with said bottom wall and having a sliding fit with the side wall of said recess, said annular element having an inner axial portion in which said rod slides and a portion connecting said inner and outer portions engaged by the end of said spring for urging said connecting portion into abutting engagement with said bottom wall.

4. A non-pressure head for a brake cylinder device of the type having a movable piston rod and a brake cylinder piston release spring surrounding said rod, said head having one end secured to said brake cylinder device and terminating at the opposite end in an annular recess having an end wall provided with an axial opening through which said rod extends, an annular element having an axial bearing portion in which said rod is slidably mounted, said annular element being engaged by said spring and being forced thereby into abutting engagement with a portion of said head forward of said recess, said portion of said head being shaped to receive and rigidly support said annular element against radial movement, a lubricating ring disposed in said recess encircling said rod, means for compressing said ring into sliding contact with said rod, a metallic ring disposed between said ring and said end wall encircling and having sliding contact with the periphery of said rod, and means urging said metallic ring into sealing contact with said end wall.

5. In a brake cylinder device of the type provided with a movable piston rod and a release spring concentric to said rod, in combination, a non-pressure head comprising a frustro-conical body converging into a first annular portion defining a first annular recess, and then further converging into a second annular portion defining a second annular recess, and finally terminating in an in-turned flange defining an aperture through which said piston rod is free to operate, an annular bearing element forming a bearing for axial movement of said piston rod adapted to be nested in said first recess by pressure exerted by said release spring, said bearing element forming with said second recess and said in-turned flange a lubricating chamber, an absorbent oil ring in said lubricating chamber for encircling and lubricating said piston rod, means for urging said ring into lubricating engagement with the periphery of said piston rod, a metallic ring in said lubricating chamber adapted to encircle and have cleaning engagement with the periphery of said piston rod, means for positioning said oil ring and said metallic ring axially in said lubricating chamber, and an oil absorbent and retaining medium in said lubricating chamber for supplying lubricant to said oil ring.

6. In a brake cylinder device of the type provided with a movable piston rod and a release spring concentric to said rod, in combination, a non-pressure head comprising a frustro-conical body converging into a first annular chamber defining a first annular recess, and further converging into a second annular portion defining a second annular recess of smaller diameter than and joined to the first annular recess by an annular wall, and finally terminating in an inturned flange defining an aperture through which said rod is free to operate, an annular element supporting one end of said release spring and having a cylindrical portion slidably mounted in said first annular recess and urged therein by said release spring, an annular gasket interposed and compressed between said annular wall and annular element by said spring, said annular element having an axial sleeve-like portion forming a bearing for axial movement of said rod, said annular element forming with said second annular recess and said inturned flange a lubricating chamber, an absorbent oil ring in said lubricating chamber for encircling and lubricating said piston rod, means for urging said oil ring into lubricating engagement with the periphery of said piston rod, a metallic ring in said lubricating chamber between said oil ring and said inturned flange encircling and having cleaning engagement with the periphery of said rod, and means for positioning said metallic ring axially in said chamber in engagement with said inturned flange.

7. In a brake cylinder device of the type provided with a movable piston rod and a release spring concentric to said rod, in combination, a non-pressure head drawn from sheet metal and comprising, integrally formed, a frustro-conical body converging into a first annular portion defining a first annular recess and then further converging into a second annular portion defining a second annular recess and finally terminating in an inturned flange defining an aperture through which said rod is free to operate, an annular bearing member having a bearing for axial movement of said piston rod and urged into said first annular recess by pressure exerted by said release spring, said annular bearing element forming with said second annular portion of said non-pressure head and said inturned flange a lubricating chamber, an absorbent oil ring in said lubricating chamber for encircling and lubricating said piston rod, a metallic ring in said lubricating chamber between said oil ring and inturned flange encircling and having cleaning engagement with the periphery of said piston rod, means for positioning said metallic ring axially on said piston rod in engagement with the inside surface of said inturned flange, and means adapted to be secured to the end of said piston rod outside of said non-pressure head for engaging the outside surface of said inturned flange to hold said piston rod, annular bearing element, oil ring and metallic ring assembled in said non-pressure head against the pressure of said release spring.

8. A lubricating and sealing arrangement for a brake cylinder device of the type having a piston rod and a non-pressure head provided with a bearing for said rod and also having to one side of said bearing an opening through which said rod extends and between said bearing and opening an annular recess encircling said rod, said arrangement comprising an absorbent oil ring in said recess encircling and having sliding contact with the periphery of said rod, a metallic ring in said recess between said oil ring and said opening encircling and having cleaning contact with the periphery of said rod, means for urging said metallic ring against the end of said head around said opening, means for urging said oil ring against the opposite end of said annular recess, and an oil absorbent and retaining ring interposed between the end walls of said annular recess and encircling the first named oil ring and said metallic ring for supplying lubricant to the first named oil ring.

CLYDE C. FARMER.